June 10, 1958 L. B. McMANIS 2,838,742

SEISMIC GAIN CONTROL

Filed Dec. 29, 1951 2 Sheets-Sheet 1

INVENTOR:
LOUIS B. Mc MANIS
BY Newell Pottorf
ATTORNEY

June 10, 1958 L. B. McMANIS 2,838,742

SEISMIC GAIN CONTROL

Filed Dec. 29, 1951

2 Sheets-Sheet 2

INVENTOR.
LOUIS B. McMANIS
BY Newell Pottorf
ATTORNEY

United States Patent Office 2,838,742

Patented June 10, 1958

2,838,742

SEISMIC GAIN CONTROL

Louis B. McManis, Tulsa, Okla., assignor to Pan American Petroleum Corporation, a corporation of Delaware Application December 29, 1951, Serial No. 264,156

3 Claims. (Cl. 340—15)

This invention relates to automatic gain controls and is directed particularly to automatically controlling the gain of a multiple-channel amplifier of the type commonly used in seismic geophysical surveying.

Some of the problems encountered in controlling the gain of seismic amplifiers arise in the necessity for providing simultaneously a very wide range of control corresponding with the wide amplitude range of received seismic signals, a high speed of response without instability, and a close matching of the gain and the gain-control action in all of a plurality of channels. In addition to the foregoing requirements, some provision must ordinarily be made for recording at the proper amplitude, first break signals which are small in amplitude compared with those created by the surface waves received immediately following.

A primary object of my invention, therefore, is to provide a gain-control system for a multiple-channel seismic amplifier having the foregoing desired characteristics of wide amplitude range, high speed, accurate matching between channels, and satisfactory recording for first breaks. Other objects are to provide a gain-control system of improved reliability and stability over extended periods of time, as well as easy adjustability of the speed of the control action. Further objects, uses, and advantages of the invention will become apparent as the description proceeds.

In brief, the system of my invention comprises a multiple-channel amplifier in which each channel is provided with a relay-controlled first-break by-pass path from the first to the final amplifier stage around the variable-gain section. The early or initial gain of the automatically-controlled section of each amplifier channel is pre-set by a fixed-amplitude signal from a single control-voltage source which is the same for all channels. The controlled section itself comprises an automatic-gain-controlled amplifier having a feed-back loop which is responsive to the control-voltage frequency for maintaining at the output of the variable section a substantially constant amplitude of the control frequency. Where the control-voltage frequency lies within the signal-frequency band, the first-break relay is arranged to disconnect the control voltage simultaneously with the shifting of the final amplifier stage from the by-pass path to the main channel after the first breaks have been recorded.

Where the control frequency is outside the signal-frequency band, a filter excludes it from the final amplifier stage, and the feedback path which is sensitive primarily to the control-signal frequency then operates to maintain the amplitude of the control signal constant at the filter input. Variation of the amplitude of the control signal which is fed into the variable-gain amplifier in parallel with the seismic signals then changes the gain simultaneously for both the signal and the control voltage in the manner desired to accommodate the signal variations. Any number of such channels are controlled from a single control-voltage source whose amplitude is adjusted in any desired manner, particularly by the average seismic signal level at the outputs of all the individual channels.

This will be better understood by reference to the accompanying drawings forming a part of this application and illustrating a preferred embodiment and certain modifications of the invention. In these drawings, Figure 1 is a block diagram of a single channel of a multiple-channel system embodying the invention;

Figures 1, 2, 3:
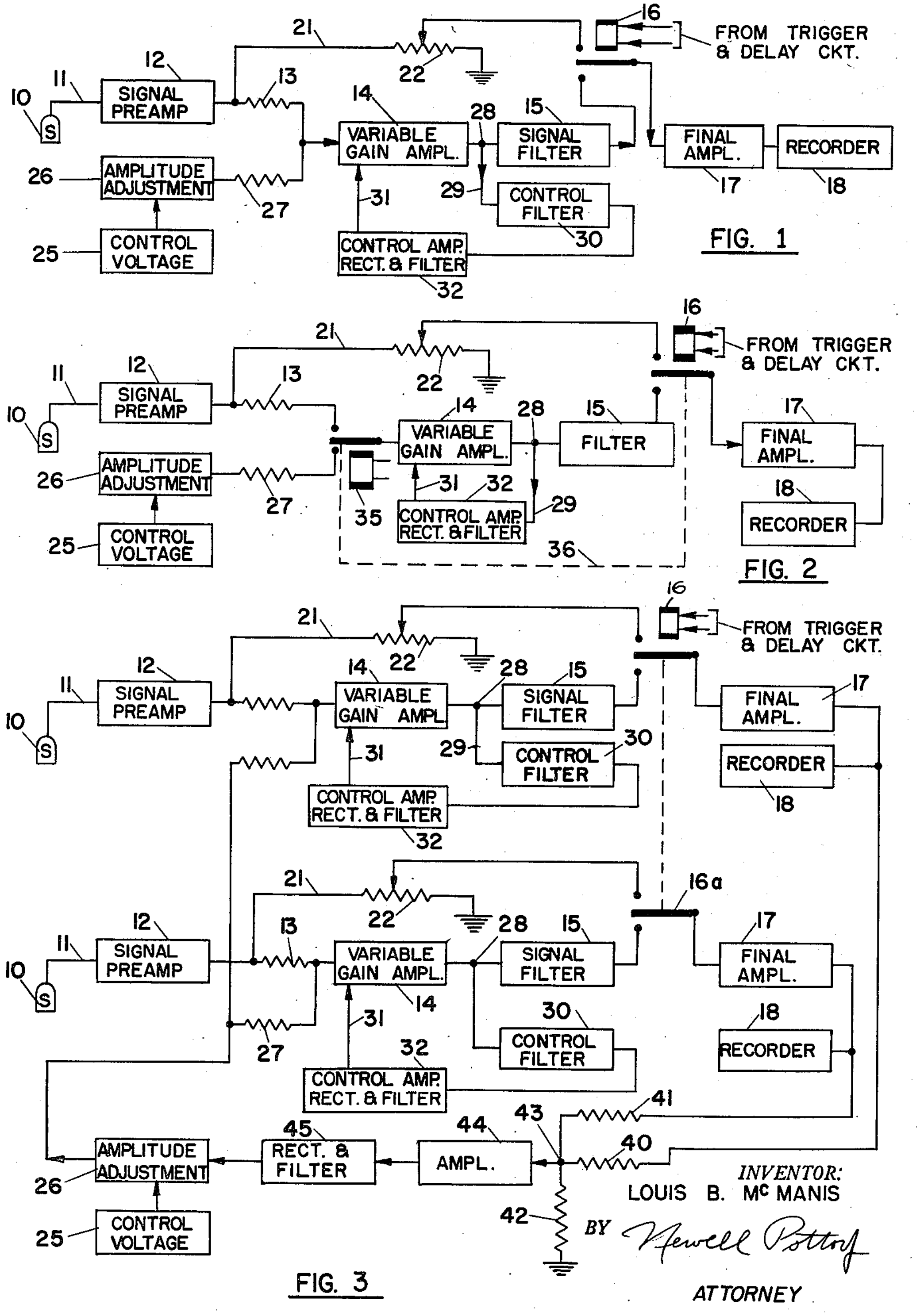
Figure 2 is a block diagram of a modified single channel of a multiple-channel system.
Figure 3 is a block diagram of a multiple-channel system forming the preferred embodiment of the invention.

Referring now to these drawings in detail and particularly to Figure 1 thereof showing a single channel embodying my invention, a seismometer or seismometer group 10 is connected by a lead 11 to a signal pre-amplifier 12 of any suitable or conventional type. Through a high impedance 13, typically a resistor of about 2 megohms or more, the output of signal amplifier 12 is applied to a variable-gain amplifier 14 which is connected to a signal filter 15, and, thence through the contacts of a relay 16, to a final amplifier stage 17 which feeds the recorder 18, typically including a vibration galvanometer. For the purpose of recording the first breaks received by seismometer 10 at a desired amplitude independent of filtering and of the action of variable amplifier 14, a by-pass lead 21 extends from the output of signal pre-amplifier 12 through a potentiometer gain adjustment 22 to a contact of relay 16 by which it may be connected to final amplifier 17 when the relay is energized.

For the purpose of gain control, an alternating-current voltage of substantially constant amplitude is generated in a control-voltage source 25, its amplitude is adjusted or varied by a device 26, and it is then applied in parallel with the signal from pre-amplifier 12 through a high impedance 27 to the variable-gain amplifier 14. From the point 28 at the output of variable-gain amplifier 14, a lead 29 extends to a control-voltage filter 30 passing essentially only the voltage of frequency generated by source 25. The output of filter 30 is amplified, rectified, filtered by a unit 32, and fed as a direct current over the lead 31 from unit 32 to amplifier 14 to control its gain.

Considering the operation of the circuit thus far described, it will be apparent that the function of the feedback loop including the amplifier 14, filter 30, and amplifier, rectifier, filter combination 32, is such as to maintain at the output 28 of amplifier 14 a substantially constant amplitude of the control voltage received from source 25. Therefore, by adjusting or varying the amplitude of this voltage by the device 26, before it is applied through impedance 27 in parallel with the signal coming in over impedance 13, the gain of amplifier 14 can be made to assume any value desired for the signal from amplifier 12. Thus, upon increasing the control-voltage amplitude by device 26, the gain of amplifier 14 is correspondingly reduced to bring it to a given level at point 28. Conversely, upon decreasing the control-voltage amplitude by device 26, the gain of amplifier 14 is increased to bring the control voltage to the same level at point 28. Therefore, for seismic recording, it is necessary only to vary the adjustment means 26 in some manner with the seismic signal level being recorded as, for example, by a manual control, by a time-controlled expansion, or by an automatic control depending on the seismic signal level.

A particular advantage of this circuit is that it is substantially independent of the characteristics and gain of the elements in the amplifier 14. This is a decided advantage in matching the gains and gain-control actions in a plurality of such circuits, as it becomes unnecessary to use any particular care in selecting the tubes employed in this section of the amplifier channels. It is ordinarily not difficult to detect the occurrence of changes in the gain of the fixed-gain stages 12 and 17. In this embodiment it will be understood that the frequency of control-voltage source 25 is normally far enough removed from the signal-frequency range, so that the control voltage is excluded from the recorder by filter 15, whereas the control filter 30 excludes the signal from the feed-back path through amplifier 32 and lead 31.

A modification of this invention is shown in Figure 2 in which the control voltage from source 25, adjusted in amplitude by device 26, is used primarily only to establish the initial gain conditions in amplifier 14 during the time that the first break by-pass path 21 is in operation. In this instance the control voltage may be of any frequency to which amplifier 14 and unit 32 can respond including a frequency within the signal-frequency band, which would normally be passed by the filter 15 and registered by recorder 18. During the time that control voltage is being applied through impedance 27, however, relay 16 is energized so that the signal is being transmitted over the by-pass path 21, while the output of filter 15 is disconnected from the recorder. Consequently, control voltage 25 operates only to pre-set the gain of amplifier 14 at a value to record at proper amplitude the waves to be received when the recorder is switched back to the main channel from by-pass 21. A relay 35 is interposed at some appropriate place between control-voltage source 25 and the input to variable amplifier 14, for example, at the amplifier input lead which is thereby shifted from impedance 27 to impedance 13 simultaneously with the operation of relay 16, as is signified by the dotted connection 36.

Thus, in operation, upon the shifting of the signal path by relay 16 from path 21 to the output of filter 15, relay 35 shifts the input of amplifier 14 from impedance 27 to impedance 13; and thereafter amplifier 14 is controlled according to the amplitude of signal received from amplifier 12, operating through the feed-back amplifier 32 and lead 31 to control the variable-gain amplifier 14 in accordance with the signal amplitude. By this means, the first breaks are recorded at a satisfactory level as determined by the setting of potentiometer 22, whereas the amplifier 14 is appropriately controlled by the voltage 25 for the signals immediately following. Consequently, no delay is experienced in shifting the signal from one path to the other, and the record obtained is continuous in nature.

Referring now to Figure 3, in this figure is shown an embodiment of the invention particularly as it is applied to a multiple-channel amplifier. For purposes of the description only too such channels are shown, but from the illustration it will be immediately apparent how the invention can be applied to any number of such channels. Thus, each channel may correspond exactly with that shown in Figure 1, preferably being made up of the signal pre-amplifier 12 feeding, through the resistance 13, the variable-gain amplifier 14, which feeds the signal filter 15 and the final amplifier stage 17 and recorder 18, in series. The by-pass path 21, controlled by potentiometer 22, is utilized when relay 16 is energized, the relay **16*a* in the additional channel being simultaneously energized to switch from the by-pass to the signal path through amplifier 14**.

For the purpose of controlling the gain of the system in accordance with the average signal level, leads from the output stage 17 of the two channels extend respectively to each of a pair of high resistances 40 and 41, joined together at the point 43 and connected therefrom to ground through a resistance 42. Point 43 is connected also to an amplifier 44 which feeds a rectifier and filter

45, the output of which is applied to the control means 26 to vary the amplitude of the control voltage from source 25, which is then applied through the resistors 27 in parallel with the signals entering variable-gain amplifiers 14 through the resistances 13. By making resistors 40 and 41 large compared to the value of resistor 42, the current through these resistors is proportional to the amplitude of the instantaneous voltages at the output stages 17. These currents add together at the point 43 and in traversing the resistor 42 to ground accordingly produce across this latter resistor a voltage drop proportional to the summation or average of all of the individual voltages from stages 17. Consequently, the output of the rectifier 45 varies as the average value of the signals in all of the multiple amplifier channels. In this manner, individual signals of amplitude different from the average are recorded with fidelity, whereas the gain of each variable-gain amplifier 14 is rendered substantially independent of the tube constants within the circuit, as each control loop within the channel operates to maintain, at the point 28, a constant level of the control voltage applied through the resistance 27. A system is thus provided having a type of double feed-back loop control, the loop within each individual channel being responsive to the control voltage, whereas the loop adjusting the control voltage is responsive to the average signal level.

Figure 4:
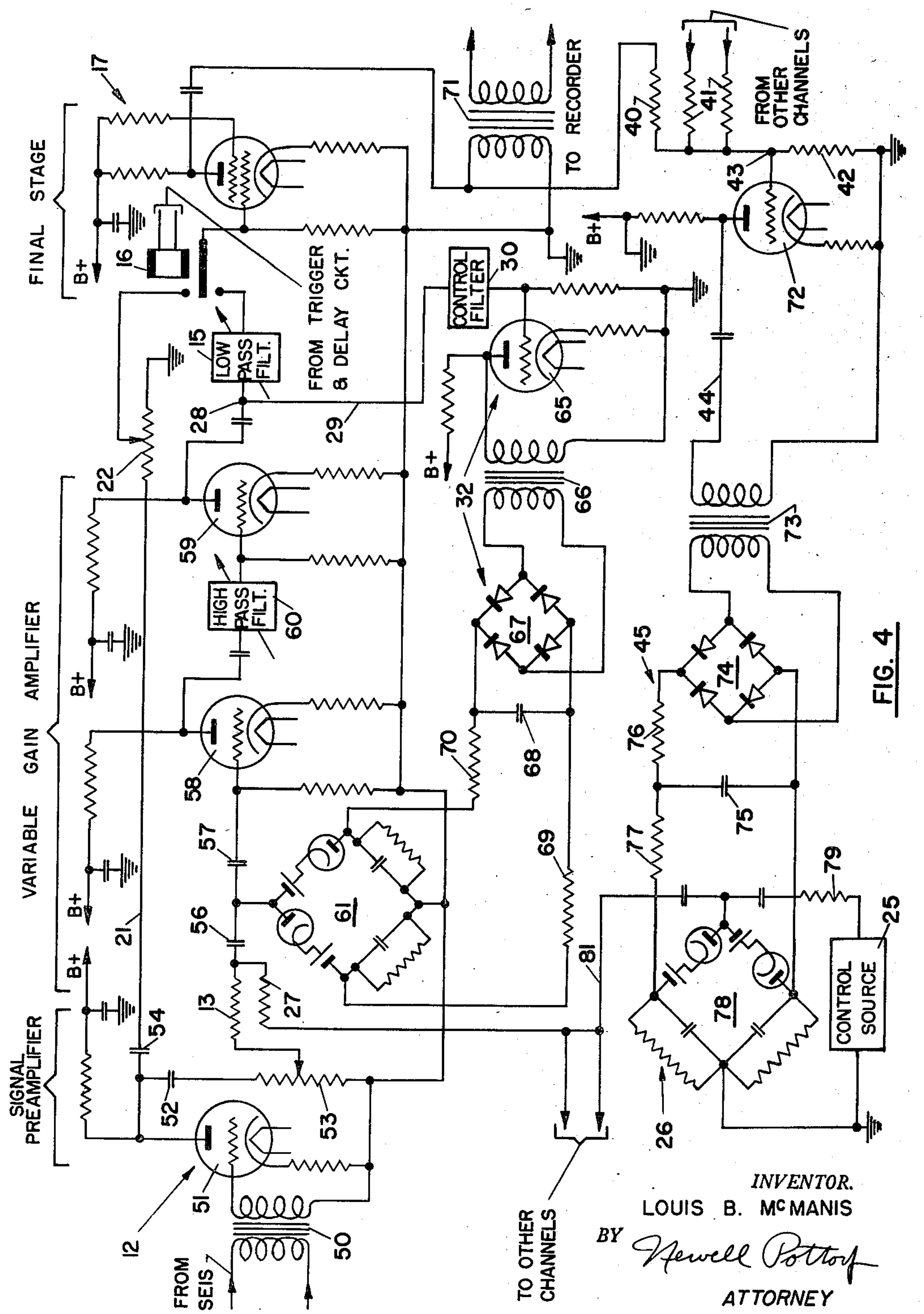
Figure 4 is a schematic wiring diagram of one channel of the system shown in Figure 3 together with the main control channel operating on a plurality of channels in parallel.

In Figure 4 is shown a schematic wiring diagram of a portion of a multiple-channel amplifier embodying this invention corresponding generally to that shown in Figure 3, except that only one of the multiple channels is illustrated in detail. Thus, the amplifier circuits are generally conventional in form, the signal from the seismometer 10, for example, beng applied through a transformer 50 to the grid of a tube 51 forming the pre-amplifier 12. The plate circuit of tube 51 is coupled through a condenser to a potentiometer 53, the slider of which is connected to the resistance 13, and by which potentiometer the over-all gain of the system may be regulated to produce the desired "final" gain value. The by-pass lead 21 is connected also to the plate circuit of tube 51 through a condenser 54.

The resistance 13 is coupled to the variable-gain amplifier 14 through a pair of series condensers 56 and 57, the variable-gain amplifier employing the vacuum tubes 58 and 59, conventionally coupled, and also including a high-pass filtering circuit 60, which is adjustable to determine the cut-off point of the low frequencies being transmitted. From a point between condensers 56 and 57 to ground is connected a diode bridge 61 consisting of a pair of biased thermionic diodes connected back to back in one branch of the bridge, the other two arms of the bridge being formed by condensers shunted by suitable resistances. In conjunction with resistance 13, this bridge forms the variable resistance of an L-pad attenuator, the resistance of the attenuator shunt arm being determined by the current applied across the horizontal bridge diagonal. From the point 28 following tube 58 terminating the variable-gain amplifier 14, the lead 29 extends to the filter 30 passing essentially only the control-voltage frequency. The output of filter 30 is applied to the amplifier 32 comprising the vacuum tube 65, which feeds an output transformer 66 connected to a rectifier bridge 67, producing across a filtering condenser 68 a unidirectional voltage which is proportional to the amplitude of the control voltage at the point 28. Through the filtering resistance 69 and 70, this voltage is applied across the diode bridge 61 to vary the current through the diodes and thus determine their effective resistance to ground across the main signal channel. The polarity of the voltage across condenser 68 applied to bridge 61 is such as to vary the resistance of bridge 61 in a direction to maintain the control voltage substantially constant at point 28.

From final stage 17, the output of the channel is conventionally applied through a transformer 71 to the recorder 18. From either the primary or secondary winding of this transformer, preferably the primary, a lead is taken off through the high resistance 40 to the junction point 43 to which are tied other similar high resistances 41 from other channels of the multiple-channel amplifier. From the point 43 the amplifier 44 is energized, the point 43 being connected to the grid of a tube 72, the output of which is applied through a transformer 73 to a rectifier bridge 74, and filtered by the condenser 75 and series resistances 76 and 77, the resultant direct-current voltage being then applied across a diode bridge 78 similar to bridge 61 and likewise forming, in combination with a resistance 79, an L-pad attenuator for the output of voltage source 25. The resultant control voltage is applied over the lead 81 to the resistance 27 in each channel, all channels being supplied as shown from the single lead 81.

In the circuit described, since the control-oscillator frequency is normally considerably higher than the signal frequency received from the seismometers, it is necessary only to apply a small amount of filtering by means of the condenser 68 and resistors 69 and 70 in the control loop within the signal channel. Thus, as far as this control loop is concerned, it can be made to vary rapidly, responsive to the variation in control-voltage level. The over-all time constant of the system is accordingly determined by the filtering in the averaging channel provided by the resistors 76 and 77 and the condenser 75. This resistance-condenser combination is thus the one which controls the over-all response characteristics of the system to the seismic signals and accordingly may be easily changed as desired, by varying the values of the resistors 76 and 77 or the condenser 75. Furthermore, since this single filter controls the time constant for the entire group of multiple channels, no variations are possible between the individual channels as to the time constant of their response to seismic signals. The system is thus one which is highly stable and is furthermore independent of the gains of the respective amplifier tubes 58 and 59.

While I have described my invention in terms of the foregoing specific embodiments and modifications, it is to be understood that still further modifications will be apparent to those skilled in the art. The scope of invention, therefore, should not be considered as limited to the details of the embodiments specifically described, but rather is to be ascertained by reference to the appended claims.

I claim:

1. An amplifier channel for the output of a seismic detector, including a variable-gain amplifier substantially uniformly responsive over a substantial frequency range feeding a signal filter and means for controlling the gain of said variable-gain amplifier, said gain-controlling means comprising a source of alternating control voltage of a frequency substantially above the frequency range of seismic signals passed by said signal filter but within the response range of said variable-gain amplifier, means for varying the amplitude of control voltage taken from said source in accordance with the amplitude variation of said seismic detector output, a lead including a high impedance connecting the control-voltage output of said amplitude-varying means to the signal input terminal of said variable-gain amplifier, whereby said control voltage and said seismic detector output are fed into said variable-gain amplifier in parallel to be equally and simultaneously amplified thereby, a filter passing substantially only said control voltage connected to the output of said variable-gain amplifier in parallel with said signal filter, a control-voltage amplifier connected to the output of said control-voltage filter, a control-voltage rectifier and low-pass filter connected to the output of said control-voltage amplifier for producing a direct-current voltage varying with the average amplitude of said control voltage at the output of said variable-gain amplifier, and means for applying said direct-current voltage to the gain-varying element of said variable-gain amplifier with a polarity acting to increase the gain of said variable-gain amplifier when the amplitude of said control voltage at the output of said variable-gain amplifier decreases and vice versa, whereby said control-voltage filter, amplifier, rectifier, and low-pass filter form a gain-controlling feedback loop tending to maintain the amplitude of said control voltage constant at the output of said variable-gain amplifier while similarly controlling the gain of said variable-gain amplifier for seismic signals.

2. An amplifier channel as in claim 1 in which said control-voltage amplitude-varying means comprises means connected to and actuated by the signal outputs of a plurality of similar amplifying and recording channels for averaging said channel signal outputs, and an attenuator on the output of said control-voltage source connected to and actuated by said averaging means.

3. An amplifier channel as in claim 1 including also a bypass lead extending around said variable-gain amplifier from said seismic detector output to a recorder, and switching means for shifting the connection to said recorder between said bypass lead and the output of said signal filter.

References Cited in the file of this patent

UNITED STATES PATENTS

| | | |
|---|---|---|
| 1,681,532 | Gardner | Aug. 21, 1928 |
| 2,255,479 | Clarke | Sept. 9, 1941 |
| 2,350,951 | Zinn | June 6, 1944 |
| 2,410,303 | Petty | Oct. 29, 1946 |
| 2,554,132 | Van Zelst | May 22, 1951 |
| 2,558,954 | Henson | July 3, 1951 |
| 2,600,051 | Fay et al. | June 10, 1952 |
| 2,626,993 | Wright et al. | Jan. 27, 1953 |